United States Patent
Yang et al.

(10) Patent No.: US 10,674,337 B2
(45) Date of Patent: Jun. 2, 2020

(54) METHOD AND DEVICE FOR PROCESSING OPERATION FOR DEVICE PERIPHERAL

(71) Applicant: ZTE Corporation, Shenzhen (CN)

(72) Inventors: Kun Yang, Shenzhen (CN); Hao Wu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 535 days.

(21) Appl. No.: 14/785,404

(22) PCT Filed: Aug. 16, 2013

(86) PCT No.: PCT/CN2013/081618
§ 371 (c)(1),
(2) Date: Feb. 18, 2016

(87) PCT Pub. No.: WO2014/169547
PCT Pub. Date: Oct. 23, 2014

(65) Prior Publication Data
US 2016/0192110 A1 Jun. 30, 2016

(30) Foreign Application Priority Data
Apr. 17, 2013 (CN) .......................... 2013 1 0134150

(51) Int. Cl.
*H04W 4/70* (2018.01)
*H04W 4/38* (2018.01)
*H04M 1/725* (2006.01)

(52) U.S. Cl.
CPC ......... *H04W 4/70* (2018.02); *H04M 1/72527* (2013.01); *H04W 4/38* (2018.02)

(58) Field of Classification Search
CPC .. H04W 4/005; H04W 4/006; H04M 1/72527
See application file for complete search history.

(56) References Cited

U.S. PATENT DOCUMENTS

| 2005/0090254 A1* | 4/2005 | Hidaka ............. H04L 29/12216 455/435.1 |
| 2011/0213871 A1 | 9/2011 | Digirolamo |

(Continued)

FOREIGN PATENT DOCUMENTS

| CN | 1612502 A | 5/2005 |
| CN | 102143562 A | 8/2011 |

(Continued)

OTHER PUBLICATIONS

European Search Report for corresponding application EP 13 88 2098; Report dated Mar. 23, 2016.

(Continued)

*Primary Examiner* — Lester G Kincaid
*Assistant Examiner* — Maryam Soltanzadeh
(74) *Attorney, Agent, or Firm* — Cantor Colburn LLP (57) ABSTRACT

The provided are a method and device for processing one or more operations for a device peripheral. The method includes that: a transaction including the one or more operations for the device peripheral is acquired, wherein the transaction includes operation content of the one or more operations for the device peripheral and a preset control parameter of the one or more operations for the device peripheral; the one or more operations for the device peripheral are executed according to the operation content; and operation execution information of the one or more operations for the device peripheral is determined according to the preset control parameter. The present disclosure solves the problem in related art, thereby achieving the effect of processing the one or more operations for the device peripheral in time and effectively improving the transaction execution efficiency.

16 Claims, 6 Drawing Sheets

(56) References Cited

U.S. PATENT DOCUMENTS

| | | | |
|---|---|---|---|
| 2013/0003576 A1 | 1/2013 | Segura | |
| 2013/0203394 A1* | 8/2013 | Dong | H04W 4/70 |
| | | | 455/414.1 |
| 2014/0143390 A1* | 5/2014 | Umapathy | H04L 41/0813 |
| | | | 709/221 |
| 2014/0143395 A1* | 5/2014 | Geltner | H04W 4/70 |
| | | | 709/223 |

FOREIGN PATENT DOCUMENTS

| | | | |
|---|---|---|---|
| CN | 102244666 A | | 11/2011 |
| CN | 102761914 A | | 10/2012 |
| EP | 2466791 A | | 6/2012 |
| EP | 2571224 A1 | * | 3/2013 |
| WO | WO 2011/098661 | * | 8/2011 |
| WO | 2011098661 A1 | | 9/2011 |

OTHER PUBLICATIONS

International Search Report for corresponding application PCT/CN2013/081618 filed Aug. 16, 2013, dated Jan. 30, 2014.

* cited by examiner

METHOD AND DEVICE FOR PROCESSING OPERATION FOR DEVICE PERIPHERAL

TECHNICAL FIELD

The present disclosure relates to the field of communications, including a method and device for processing an operation for a device peripheral.

BACKGROUND

Architecture of Machine-to-Machine/Man (M2M) communication system is divided into an M2M application layer, an M2M service capability layer, a communication network layer, an M2M terminal and sensing extension layer and a management support system. Wherein, M2M device peripherals in the M2M terminal and sensing extension layer can be divided into two kinds of the M2M device peripherals according to the capability of the M2M device peripheral: one is an M2M terminal with the capability of communicating with an M2M communication network, wherein the M2M terminal can directly access an M2M service platform through the communication network, interact with the M2M service platform to complete register, authentication and authorization of the M2M terminal, and provide sensing information needed by an application to perform service interaction with the application through the M2M service platform, and receive management to the device peripheral; the other is an M2M gateway with the capability of communicating with the M2M communication network and an M2M stub network; except enabling the M2M stub network and a sensing device to access a network, the M2M gateway can also receive management information for managing an M2M stub network node, and perform protocol conversion between the M2M stub network and the M2M communication network. The device peripheral is a sensor and other terminals which perform environment sensing and data acquisition; they can only conduct short-distance communication because of their limited processing capacity, storage capacity, power and other resources; such type of single terminal is called the device peripheral, and a network composed of multiple such terminal nodes is called the M2M stub network.

The M2M stub network comprises the sensor and other nodes with capabilities of information acquisition, single processing and communication; the M2M stub network aims to cooperate to sense, acquire related information of monitored objects in a network coverage area, and send monitoring data to the M2M gateway, and then the M2M gateway transmits, through the communication network, sensing data to the M2M service platform or the application to analyze and process.

The device peripheral comprises the sensor and other single device with an environment sensing function; it can send sensed information to the M2M service platform through the M2M gateway or the M2M terminal as well as receive downlink control of the M2M application or the M2M service platform on the M2M terminal.

A group of associated operations for the device peripheral is called a transaction; it can be either a group of operations for a single device peripheral or a group operation for multiple or a group of device peripherals. In related art, when the operation for the device peripheral is unsuccessfully executed for many times, or there is no feedback of the execution of the operation for the device peripheral for a long time, the M2M gateway does not have an effective processing mechanism for the operation which cannot be executed successfully.

Thus, there is a problem in related art that the operation for the device peripheral cannot be effectively controlled and processed, which greatly affects the processing efficiency of the system on the transaction.

SUMMARY

The present disclosure provides a method and device for processing an operation for a device peripheral, for at least solving the problem in related art that the operation for the device peripheral cannot be effectively controlled and processed, which greatly affects the processing efficiency of the system on the transaction.

According to an aspect of the present disclosure, a method for processing one or more operations for a device peripheral is provided, comprising: acquiring a transaction comprising the one or more operations for the device peripheral, wherein the transaction comprises operation content of the one or more operations for the device peripheral and a preset control parameter of the one or more operations for the device peripheral; executing the one or more operations for the device peripheral according to the operation content; and determining operation execution information of the one or more operations for the device peripheral according to the preset control parameter.

In an example embodiment, the preset control parameter comprises delivery attempt times of the one or more operations for the device peripheral and/or validity time of the one or more operations for the device peripheral.

In an example embodiment, acquiring the transaction comprising the one or more operations for the device peripheral comprises: receiving policy definition information which is issued from a Machine-to-Machine/Men, M2M, service platform, wherein the policy definition information comprises the transaction comprising the one or more operations for the device peripheral and a trigger condition of the transaction; when it is detected that the trigger condition of triggering the transaction is satisfied, retrieving the transaction corresponding to the trigger condition.

In an example embodiment, determining the operation execution information of the one or more operations for the device peripheral according to the preset control parameter comprises: receiving operation execution information fed back by the device peripheral; when the operation execution information fed back by the device peripheral indicates that the one or more operations for the device peripheral are executed successfully, determining that the one or more operations for the device peripheral are executed successfully; and/or, when the operation execution information fed back by the device peripheral indicates that the one or more operations fail to be executed, re-executing the one or more operations for the device peripheral according to the delivery attempt times of the one or more operations for the device peripheral and/or the validity time of the one or more operations for the device peripheral, and determining that the one or more operations for the device peripheral fail to be executed according to operation execution information fed back by the device peripheral after the one or more operations for the device peripheral are re-executed.

In an example embodiment, determining that the one or more operations for the device peripheral fail to be executed according to the operation execution information fed back by the device peripheral after the one or more operations for the device peripheral are re-executed comprises at least one of the followings: when the operation execution information which is fed back by the device peripheral and indicates that the one or more operations are executed successfully is not received, and the number of times of executing the one or more operations for the device peripheral reaches the delivery attempt times of the one or more operations for the device peripheral, determining that the one or more operations for the device peripheral fail to be executed; when the operation execution information which is fed back by the device peripheral and indicates that the one or more operations are executed successfully is not received, and the validity time expires, determining that the one or more operations for the device peripheral fail to be executed; when the operation execution information which is fed back by the device peripheral and indicates the one or more operations are executed successfully is not received, and the number of times of executing the one or more operations for the device peripheral reaches the delivery attempt times of the one or more operations for the device peripheral in the validity time, determining that the one or more operations for the device peripheral fail to be executed; and when the number of times of executing the one or more operations for the device peripheral does not reach the delivery attempt times of the one or more operations for the device peripheral, but the operation execution information which is fed back by the device peripheral and indicates that the one or more operations for the device peripheral are executed successfully is not received when the validity time expires, determining that the one or more operations for the device peripheral fail to be executed.

In an example embodiment, after determining the operation execution information of the one or more operations for the device peripheral according to the preset control parameter, the method further comprises: removing the one or more operations for the device peripheral corresponding to the operation execution information.

In an example embodiment, after determining the operation execution information of the one or more operations for the device peripheral according to the preset control parameter, the method further comprises: recording the operation execution information of the one or more operations for the device peripheral.

In an example embodiment, after determining the operation execution information of the one or more operations for the device peripheral according to the preset control parameter, the method further comprises: reporting the operation execution information to an M2M service platform.

According to another aspect of the present disclosure, a device for processing one or more operations for a device peripheral is provided, comprising: an acquiring component, configured to acquire a transaction comprising the one or more operations for the device peripheral, wherein the transaction comprises operation content of the one or more operations for the device peripheral and a preset control parameter of the one or more operations for the device peripheral; an executing component, configured to execute the one or more operations for the device peripheral according to the operation content; and a determining component, configured to determine operation execution information of the one or more operations for the device peripheral according to the preset control parameter.

In an example embodiment, the preset control parameter comprises delivery attempt times of the one or more operations for the device peripheral and/or validity time of the one or more operations for the device peripheral.

In an example embodiment, the acquiring component comprises: a first receiving element, configured to receive policy definition information which is issued from a Machine-to-Machine/Men, M2M, service platform, wherein the policy definition information comprises the transaction comprising the one or more operations for the device peripheral and a trigger condition of the transaction; and a retrieving element, configured to, when it is detected that the trigger condition of triggering the transaction is satisfied, retrieve the transaction corresponding to the trigger condition.

In an example embodiment, the determining component comprises: a second receiving element, configured to receive operation execution information fed back by the device peripheral; a first determining element, configured to, when the operation execution information fed back by the device peripheral indicates that the one or more operations for the device peripheral are executed successfully, determine that the one or more operations for the device peripheral are executed successfully; and/or, a second determining element, configured to, when the operation execution information fed back by the device peripheral indicates that the one or more operations fail to be executed, re-execute the one or more operations for the device peripheral according to the delivery attempt times of the one or more operations for the device peripheral and/or the validity time of the one or more operations for the device peripheral, and determine that the one or more operations for the device peripheral fail to be executed according to operation execution information fed back by the device peripheral after the one or more operations for the device peripheral are re-executed.

In an example embodiment, the second determining element comprises at least one of the followings: a first determining sub-element, configured to, when the operation execution information which is fed back by the device peripheral and indicates that the one or more operations are executed successfully is not received, and the number of times of executing the one or more operations for the device peripheral reaches the delivery attempt times of the one or more operations for the device peripheral, determine that the one or more operations for the device peripheral fail to be executed; a second determining sub-element, configured to, when the operation execution information which is fed back by the device peripheral and indicates that the one or more operations are executed successfully is not received, and, the validity time expires, determine that the one or more operations for the device peripheral fail to be executed; a third determining sub-element, configured to, when the operation execution information which is fed back by the device peripheral and indicates the one or more operations are executed successfully is not received, and the number of times of executing the one or more operations for the device peripheral reaches the delivery attempt times of the one or more operations for the device peripheral in the validity time, determine that the one or more operations for the device peripheral fail to be executed; and a fourth determining sub-element, configured to, when the number of times of executing the one or more operations for the device peripheral does not reach the delivery attempt times of the one or more operations for the device peripheral, but the operation execution information which is fed back by the device peripheral and indicates that the one or more operations for the device peripheral are executed successfully is not received when the validity time expires, determine that the one or more operations for the device peripheral fail to be executed.

In an example embodiment, the device further comprises: a removing component, configured to remove the one or more operations for the device peripheral corresponding to the operation execution information.

In an example embodiment, the device further comprises: a recording component, configured to record the operation execution information of the one or more operations for the device peripheral.

In an example embodiment, the device further comprises: a reporting component, configured to report the operation execution information to an M2M service platform.

By acquiring the transaction including the operation for the device peripheral, wherein the transaction includes the operation content of the operation for the device peripheral and the preset control parameters of the operation for the device peripheral, executing the operation for the device peripheral according to the operation content, and determining the operation execution information of the operation for the device peripheral according to the preset control parameters, the present disclosure solves the problem in related technologies that the operation for the device peripheral cannot be effectively controlled and processed, which greatly affects the processing efficiency of the system on the transaction, thereby achieving the effect of processing the operation for the device peripheral in time and effectively improving the transaction execution efficiency.

BRIEF DESCRIPTION OF THE DRAWINGS

The accompanying drawings described here are used for providing a deeper understanding of the present disclosure, and constitute a part of the application; schematic embodiments of the present disclosure and description thereof are used for illustrating the present disclosure and not intended to form an improper limit to the present disclosure. In the accompanying drawings.

DETAILED DESCRIPTION OF THE EMBODIMENTS

The present disclosure is elaborated below with reference to the accompanying drawings and embodiments. Note that, embodiments and features in embodiments in the application can be combined with each other on condition of not conflicting.

Figure 1:
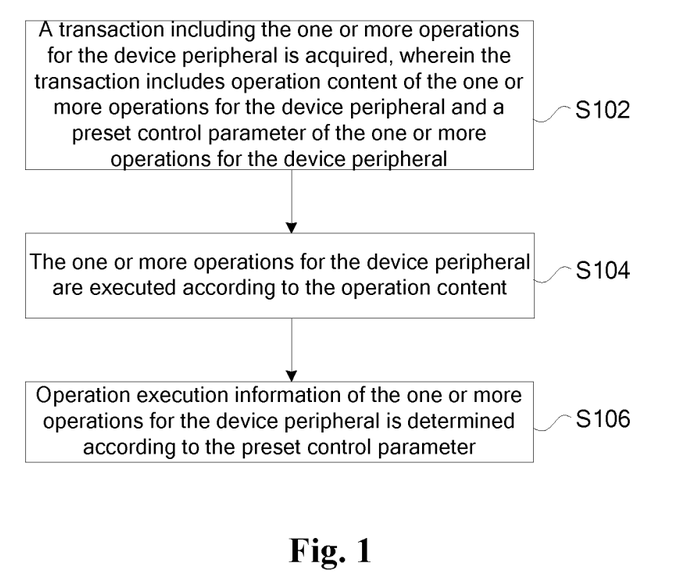
FIG. 1 is a flowchart of the method for processing the one or more operations for the device peripheral according to an embodiment of the present disclosure.

A method for processing one or more operations for a device peripheral is provided in the present disclosure; FIG. 1 is a flowchart of the method for processing the one or more operations for the device peripheral according to an embodiment of the present disclosure; as shown in FIG. 1, the flow includes the following steps:

Step 102: a transaction including the one or more operations for the device peripheral is acquired, wherein the transaction includes the operation content of the one or more operations for the device peripheral and a preset control parameter of the one or more operations for the device peripheral; in an optional manner, the preset control parameter can include the delivery attempt times of the one or more operations for the device peripheral and/or the validity time of the one or more operations for the device peripheral; in addition, it is noted that, the device peripheral described below can be either a single device peripheral or a device peripheral group;

Step 104: the one or more operations for the device peripheral are executed according to the operation content; and Step 106: the operation execution information of the one or more operations for the device peripheral is determined according to the preset control parameters.

Through the above steps, by setting the preset control parameter of the one or more operations for the device peripheral when the one or more operations for the device peripheral are executed, the method achieves the effect of processing the one or more operations for the device peripheral in time and effectively improving the transaction execution efficiency, relative to the problem in related art that the one or more operations for the device peripheral cannot be effectively controlled, which greatly affects the processing efficiency of the system for the device peripheral because only the one or more operations for the device peripheral is executed, but the execution of the one or more operations is not controlled correlatively.

There can be a variety of ways of acquiring the transaction including the one or more operations for the device peripheral, for example, the way can be directly receiving an indication from an M2M service platform; wherein, there can also be a variety of ways of receiving the indication, for example, the way can be receiving the policy definition information (or called policy definition) which is issued from the M2M service platform, wherein the policy definition information includes the transaction including the one or more operations for the device peripheral and a trigger condition for triggering the transaction; wherein the trigger condition comprises condition values needing to be satisfied when an M2M gateway executes the one or more operations for the device peripheral; then the M2M gateway detects; when it is detected that the trigger condition for triggering the transaction is satisfied, the M2M gateway retrieves locally, and the transaction corresponding to the trigger condition is retrieved.

When the operation execution information of the one or more operations for the device peripheral is determined according to the preset control parameter, there can also be a variety of processing ways in the determining process, for example, the operation execution information fed back by the device peripheral is received; under the situation that the operation execution information fed back by the device peripheral indicates that the one or more operations for the device peripheral are executed successfully, it is determined that the one or more operations for the device peripheral are executed successfully; and/or, under the situation that the operation execution information fed back by the device peripheral indicates that the one or more operations fail to be executed, the one or more operations for the device peripheral is re-executed according to the delivery attempt times of the one or more operations for the device peripheral and/or the validity time of the one or more operations for the device peripheral, and it is determined that the one or more operations for the device peripheral fail to be executed according to the operation execution information fed back by the device peripheral after the one or more operations for the device peripheral are re-executed. Wherein, it is noted that, the operation execution information may include at least one of the followings: a device peripheral identification, the one or more operations for the device peripheral is executed successfully, the one or more operations for the device peripheral fail to be executed, a status value of the device peripheral after the one or more operations for the device peripheral are executed successfully, and a reason value when the one or more operations for the device peripheral failed to be executed.

Wherein, when the preset control parameters are different, there can also be a variety of ways of determining that the one or more operations for the device peripheral failed to be executed according to the operation execution information fed back by the device peripheral after the one or more operations for the device peripheral are re-executed; for example, the ways may include at least one of the followings: under the situation that the operation execution information which is fed back by the device peripheral and indicates that the one or more operations are executed successfully is not received, and the number of times of executing the one or more operations for the device peripheral reaches the preset number of times of re-executing the one or more operations for the device peripheral, it is determined that the one or more operations for the device peripheral failed to be executed; under the situation that the operation execution information which is fed back by the device peripheral and indicates that the one or more operations are executed successfully is not received, and the validity time expires, it is determined that the one or more operations for the device peripheral failed to be executed; under the situation that the operation execution information which is fed back by the device peripheral and indicates that the one or more operations are executed successfully is not received, and the number of times of executing the one or more operations for the device peripheral reaches the preset number of times of re-executing the one or more operations for the device peripheral in the validity time, it is determined that the one or more operations for the device peripheral fail to be executed; and under the situation that the number of times of executing the one or more operations for the device peripheral does not reach the preset number of times of re-executing the one or more operations for the device peripheral, but the operation execution information which is fed back by the device peripheral and indicates that the one or more operations one the device peripheral are executed successfully is not received when the validity time expires, it is determined that the one or more operations for the device peripheral fail to be executed. It is noted that, it can be determined that the one or more operations for the device peripheral are executed successfully, provided the above conditions are not satisfied, that is, it can be determined that the one or more operations for the device peripheral are executed successfully, provided the operation execution information which is fed back by the device peripheral and indicates that the one or more operations are executed successfully is received when the preset number of times of re-executing is not reached or the preset validity time does not expire.

In an example manner, after the operation execution information of the one or more operations for the device peripheral is determined according to the preset control parameters, the M2M gateway can also remove the one or more operations for the device peripheral corresponding to the determined operation execution information, and record the operation execution information of the one or more operations for the device peripheral; in addition, preferably, the determined operation execution information can also be reported to the M2M service platform. It is noted that, before the operation execution information is reported to the M2M service platform, it is needed to judge whether the one or more operations for the device peripheral included in the transaction is executed successfully; when the judgment result is that the one or more operations for the device peripheral included in the transaction is executed successfully, it is reported to the M2M service platform that the transaction is executed successfully; and/or, when the judgment result is that the one or more operations for the device peripheral included in the transaction is not executed successfully, it is reported to the M2M service platform that the one or more operations for the device peripheral are executed unsuccessfully.

A device for processing one or more operations for a device peripheral is further provided in the present disclosure; the device is used for implementing the above embodiments and the example embodiments, and these which have been described will not be repeated here. For example, the term "component" used below can implement a combination of software and/or hardware with preset functions. Although the device described in the following embodiments is implemented by software better, the implementation of hardware or the combination of software and hardware can also be possible and conceived.

Figure 2:
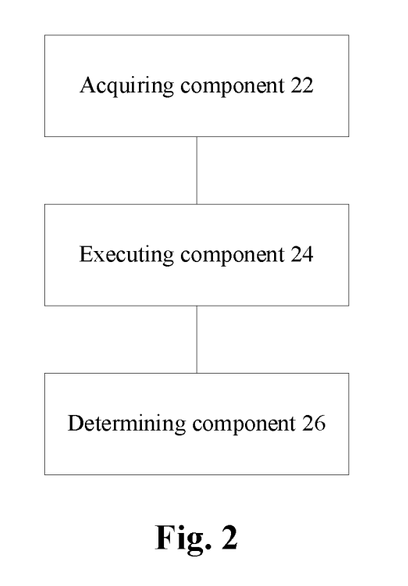
FIG. 2 is a structural diagram of the device for processing one or more operations for the device peripheral according to an embodiment of the present disclosure.

FIG. 2 is a structural diagram of the device for processing one or more operations for the device peripheral according to an embodiment of the present disclosure; as shown in FIG. 2, the device includes the acquiring component 22, the executing component 24 and the determining component 26; the device is illustrated below.

The acquiring component 22 is configured to acquire a transaction including the one or more operations for the device peripheral, wherein the transaction includes the operation content of the one or more operation for the device peripheral and a preset control parameter of the one or more operations for the device peripheral; wherein the preset control parameters can be the delivery attempt times of the one or more operations for the device peripheral and/or the validity time of the one or more operations for the device peripheral; the executing component 24 is connected to the acquiring component 22 and configured to execute the one or more operations for the device peripheral according to the operation content; the determining component 26 is connected to the executing component 24 and configured to determine the operation execution information of the one or more operations for the device peripheral according to the preset control parameter.

Figure 3:
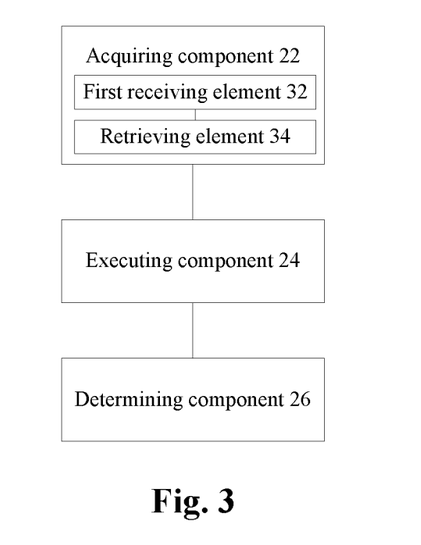
FIG. 3 is an example structural diagram of the acquiring component 22 of the device for processing the one or more operations for the device peripheral according to an embodiment of the present disclosure.

FIG. 3 is an example structural diagram of the acquiring component 22 of the device for processing the one or more operations for the device peripheral according to an embodiment of the present disclosure; as shown in FIG. 3, the acquiring component 22 includes: the first receiving element 32 and the retrieving element 34; the acquiring component 22 is illustrated below.

The first receiving element 32 is configured to receive the policy definition information which is issued from an M2M service platform, wherein the policy definition information includes the transaction including the one or more operations for the device peripheral and a trigger condition of the transaction; the retrieving element 34 is connected to the first receiving element 32 and configured to, when it is detected that the trigger condition of triggering the transaction is satisfied, retrieve the transaction corresponding to the trigger conditions.

Figure 4:
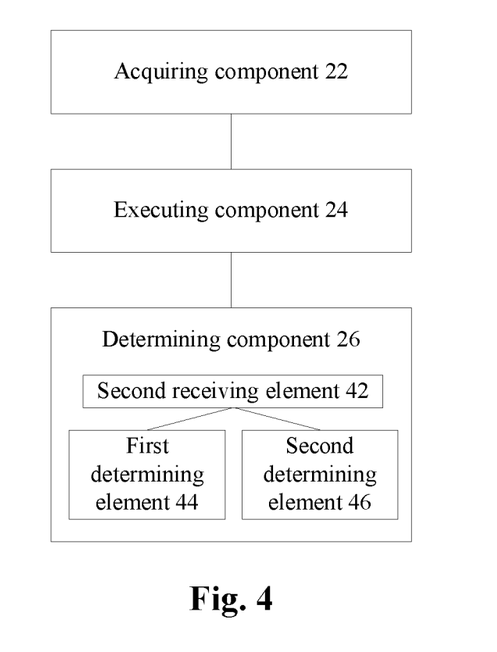
FIG. 4 is an example structural diagram of the determining component 26 of the device for processing the one or more operations for the device peripheral according to an embodiment of the present disclosure.

FIG. 4 is an example structural diagram of the determining component 26 of the device for processing the one or more operations for the device peripheral according to an embodiment of the present disclosure; as shown in FIG. 4, the determining component 26 includes the second receiving element 42, the first determining element 44 and the second determining element 46; the determining component 26 is illustrated below.

The second receiving element 42 is configured to receive operation execution information fed back by the device peripheral; the first determining element 44 is connected to the second receiving element 42 and configured to, under the situation that the operation execution information fed back by the device peripheral indicates that the one or more operations for the device peripheral are executed successfully, determine that the one or more operations for the device peripheral are executed successfully; and/or, the second determining element 46 is connected to the second receiving element 42 and configured to, under the situation that the operation execution information fed back by the device peripheral indicates that the one or more operations fail to be executed, re-execute the one or more operations for the device peripheral according to the delivery attempt times of the one or more operations for the device peripheral and/or the validity time of the one or more operations for the device peripheral, and determine that the one or more operations for the device peripheral fail to be executed according to the operation execution information fed back by the device peripheral after the one or more operations for the device peripheral are re-executed.

Figure 5:
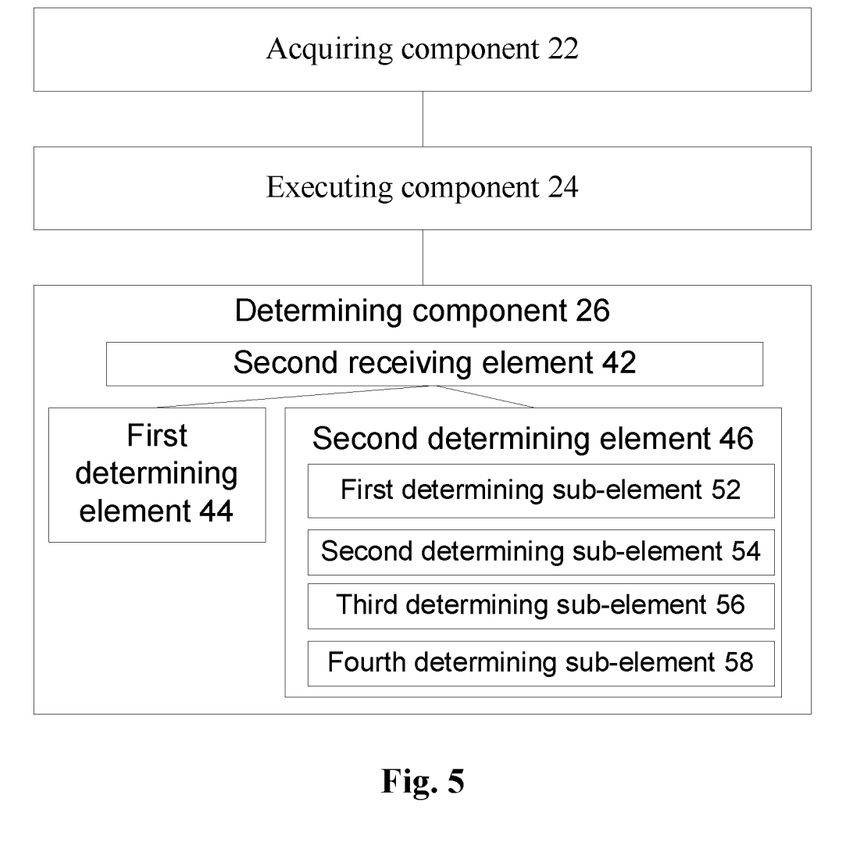
FIG. 5 is an example structural diagram of the second determining element 46 in the determining component 26 of the device for processing the one or more operations for the device peripheral according to an embodiment of the present disclosure.

FIG. 5 is an example structural diagram of the second determining element 46 in the determining component 26 of the device for processing the one or more operations for the device peripheral according to an embodiment of the present disclosure; as shown in FIG. 5, the second determining element 46 includes at least one of the followings: the first determining sub-element 52, the second determining sub-element 54, the third determining sub-element 56 and the fourth determining sub-element 58; the second determining element 46 is illustrated below.

The first determining sub-element 52 is configured to, under the situation that the operation execution information which is fed back by the device peripheral and indicates that the one or more operations are executed successfully is not received, and the number of times of executing the one or more operations for the device peripheral reaches the delivery attempt times of the one or more operations for the device peripheral, determine that the one or more operations for the device peripheral fail to be executed; the second determining sub-element 54 is configured to, under the situation that the operation execution information which is fed back by the device peripheral and indicates the one or more operations are executed successfully is not received, and, the validity time expires, determine that the one or more operations for the device peripheral fail to be executed; the third determining sub-element 56 is configured to, under the situation that the operation execution information which is fed back by the device peripheral and indicates the one or more operations are executed successfully is not received, and the number of times of executing the one or more operations for the device peripheral reaches the delivery attempt times of the one or more operations for the device peripheral in the validity time, determine that the one or more operations for the device peripheral fail to be executed; the fourth determining sub-element 58 is configured to, under the situation that the number of times of executing the one or more operations for the device peripheral does not reach the delivery attempt times of the one or more operations for the device peripheral, but the operation execution information which is fed back by the device peripheral and indicates that the one or more operations for the device peripheral are executed successfully is not received when the validity time expires, determine that the one or more operations for the device peripheral fail to be executed.

Figure 6:
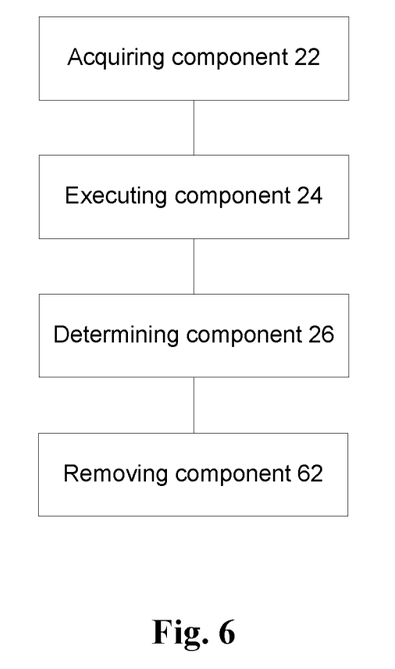
FIG. 6 is an example structural diagram 1 of the device for processing the one or more operations for the device peripheral according to an embodiment of the present disclosure.

FIG. 6 is an example structural diagram 1 of the device for processing the one or more operations for the device peripheral according to an embodiment of the present disclosure; as shown in FIG. 6, the device further includes the removing component 62 except all the components shown in FIG. 2; the removing component 62 is illustrated below.

The removing component 62 is connected to the determining component 26 and configured to remove the one or more operations for the device peripheral corresponding to the operation execution information.

Figure 7:
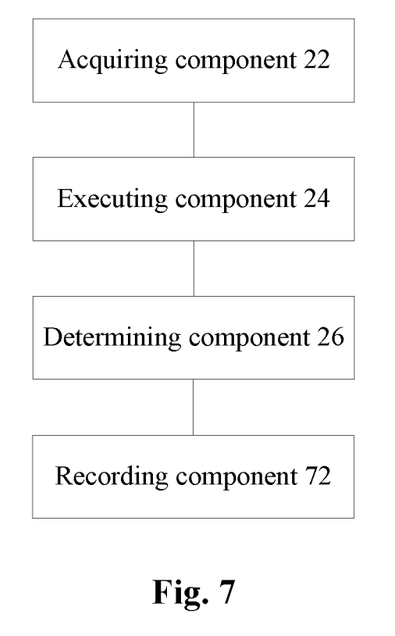
FIG. 7 is an example structural diagram 2 of the device for processing the one or more operations for the device peripheral according to an embodiment of the present disclosure.

FIG. 7 is an example structural diagram 2 of the device for processing the one or more operations for the device peripheral according to an embodiment of the present disclosure; as shown in FIG. 7, the device further includes the recording component 72 except all the components shown in FIG. 2; the recording component 72 is illustrated below.

The recording component 72 is connected to the determining component 26 and configured to record the operation execution information of the one or more operations for the device peripheral.

Figure 8:
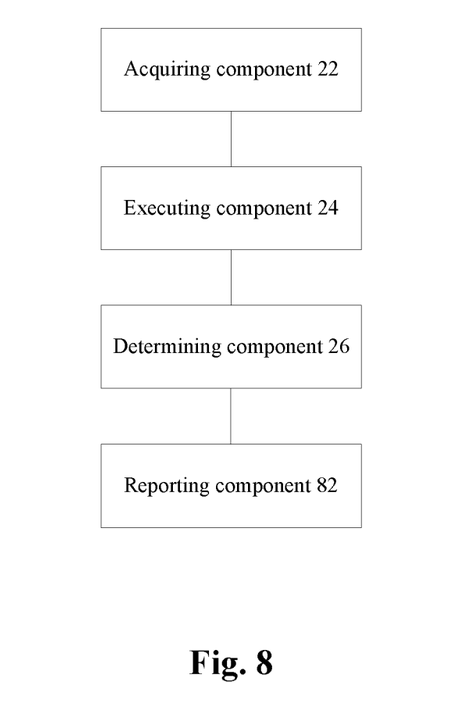
FIG. 8 is an example structural diagram 3 of the device for processing the one or more operations for the device peripheral according to an embodiment of the present disclosure.

FIG. 8 is an example structural diagram 3 of the device for processing the one or more operations for the device peripheral according to an embodiment of the present disclosure; as shown in FIG. 8, the device further includes the reporting component 82 except all the components shown in FIG. 2; the reporting component 82 is illustrated below.

The reporting component 82 is connected to the determining component 26 and configured to report the operation execution information to the M2M service platform.

In related art, the M2M stub network and the device peripheral cannot directly communicate with a communication network because of their characteristics, such as processing capacity, storage capacity, limited power, but need to access the communication network through the M2M gateway. The M2M gateway can perform protocol conversion between the M2M stub network and a top network. Except gathering and forwarding data information acquired by the M2M stub network and the device peripheral, the M2M gateway can also receive control information from the M2M service platform to manage the M2M stub network and the device peripheral. The M2M gateway receives the policy definition from the M2M service platform, or the policy definition is configured on the M2M gateway. The M2M gateway executes the operation for the device peripheral according to the trigger conditions of the transaction defined by the policy. The trigger conditions of the transaction are the condition values needing to be satisfied when the M2M gateway executes the operation for the device peripheral; the condition values can be time values of system time or a timer of the M2M gateway, or data values of one or more monitoring data of the device peripheral and/or the device peripheral group, or status values of one or more running statues of the device peripheral and/or the device peripheral group. The successful execution of transaction must be that all the operations included in the transaction are completed successfully; if any operation in the transaction is failed, then the execution of the transaction is failed.

In related art, when the operation for the device peripheral is unsuccessfully executed for many times, or there is no feedback of the execution of the operation for the device peripheral for a long time, the M2M gateway does not have an effective processing mechanism for the operation which cannot be executed successfully. That is, the operation for the device peripheral cannot be effectively controlled and processed, which greatly affects the processing efficiency of the system on the transaction. In view of this, a method for processing an operation for a device peripheral is provided in the present disclosure, so that re-execution of the operation in the transaction and a timing mechanism can be implemented through the M2M gateway, thereby improving the transaction execution efficiency. The embodiment of the present disclosure is simply illustrated below.

Figure 9:
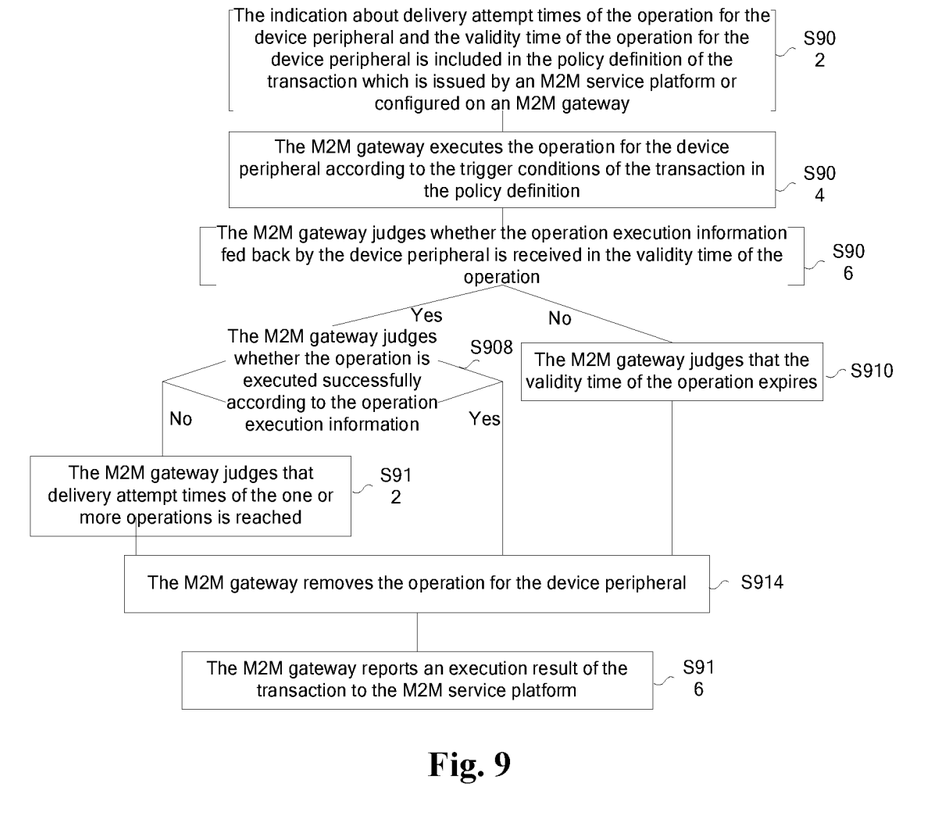
FIG. 9 is a flowchart of the method for processing the one or more operations for the device peripheral according to an example embodiment of the present disclosure.

FIG. 9 is a flowchart of the method for processing the one or more operations for the device peripheral according to an example embodiment of the present disclosure; as shown in FIG. 9, the flow includes the following step:

Step 902: the indication about the delivery attempt times of the operation for the device peripheral and the validity time of the operation for the device peripheral is included in the policy definition of the transaction which is issued by the M2M service platform or configured on the M2M gateway;

Step 904: the M2M gateway executes the operation for the device peripheral according to the trigger conditions of the transaction in the policy definition;

Step 906: the M2M gateway judges whether the operation execution information fed back by the device peripheral is received in the validity time of the operation; when the judgment result is that the operation execution information fed back by the device peripheral is received in the validity time of the operation, Step 908 is executed; or else, Step 910 is executed;

Step 908: the M2M gateway judges whether the operation is executed successfully according to the operation execution information; when the judgment result is that the operation is executed successfully according to the operation execution information, Step 914 is executed; or else, Step 912 is executed;

Step 910: the M2M gateway judges that the validity time of the operation expires;

Step 912: the M2M gateway judges that the delivery attempt times of the one or more operations is reached;

Step 914: the M2M gateway removes the operation for the device peripheral; and

Step 916: the M2M gateway reports an execution result of the transaction to the M2M service platform.

The flow is illustrated below in combination with embodiments. Embodiment 1 (both the delivery attempt times of and the validity time are set for the operation for the device peripheral):

S1: the indication about the delivery attempt times of the operation for the device peripheral and the validity time of the operation for the device peripheral is included in the policy definition of the transaction which is sent by the M2M service platform or configured on the M2M gateway;

S2: the M2M gateway executes the operation for the device peripheral according to the trigger conditions of the transaction in the policy definition;

S3: before the validity time of the operation for the device peripheral expires, the M2M gateway re-executes the failed operation for the device peripheral according to the indication about the delivery attempt times of the operation for the device peripheral;

S4: when the delivery attempt times of the operation for the device peripheral is reached or the validity time expires (as long as one condition is satisfied), the M2M gateway removes the failed operation for the device peripheral.

Embodiment 2 (only the delivery attempt times of is set for the operation for the device peripheral):

S1: the indication about the delivery attempt times of the operation for the device peripheral is included in the policy definition of the transaction which is sent by the M2M service platform or configured on the M2M gateway;

S2: the M2M gateway executes the operation for the device peripheral according to the trigger conditions of the transaction in the policy definition;

S3: the M2M gateway re-executes the failed operation for the device peripheral according to the indication about the delivery attempt times of the operation for the device peripheral;

S4: when the delivery attempt times of the operation for the device peripheral is reached, the M2M gateway removes the failed operation for the device peripheral.

Embodiment 3 (only the validity time is set for the operation for the device peripheral):

S1: the indication about the validity time of the operation for the device peripheral is included in the policy definition of the transaction which is sent by the M2M service platform or configured on the M2M gateway;

S2: the M2M gateway executes the operation for the device peripheral according to the trigger conditions of the transaction in the policy definition;

S3: before the validity time of the operation for the device peripheral expires, the M2M gateway re-executes the failed operation for the device peripheral;

S4: when the validity time of the operation for the device peripheral expires, the M2M gateway removes the failed operation for the device peripheral.

The example embodiments of the present disclosure are illustrated below in combination with the accompanying drawings.

Example embodiment 1 (the indication about the delivery attempt times of + the indication about the validity time):

S1: the M2M gateway receives and parses the policy definition which is issued by the M2M service platform, wherein the policy definition includes the transaction and the trigger conditions of the transaction;

S2: when the M2M gateway detects locally that the system time meets the time value defined by the trigger conditions of the transaction, it retrieves the transaction in the policy definition corresponding to the trigger conditions of the transaction;

wherein, the transaction is a group of associated operations for the device peripheral; the operations include: the identification of the device peripheral and/or the device peripheral group, operation information, and the indication about the delivery attempt times of the operation and the validity time;

S3: the M2M gateway buffers the operations in the transaction locally according to the identification of the device peripheral and/or the device peripheral group, sets and starts a timer according to the indication of the validity time of the operations in the transaction, and sends the operations in the transaction to the device peripheral and/or the device peripheral group corresponding to the identification;

S4: after the device peripheral and/or the device peripheral group receives and parses the operations in the transaction sent by the M2M gateway, the operation content included in the operation information is executed; for example, the running status of the device peripheral and/or the device peripheral group is set according to parameter values preset in the operation content; in addition, the device peripheral and/or the device peripheral group feeds back the operation execution information to the M2M gateway, wherein the operation execution information includes the identification of the device peripheral and/or the device peripheral group, indication of the successful execution or indication of the failed execution;

S5: the M2M gateway processes in the following way according to feedback from the device peripheral and/or the device peripheral group:

when the operation execution information indicates that the execution of the operation is successful, then the M2M gateway removes locally the operation of the device peripheral and/or the device peripheral group corresponding to the identification of the device peripheral and/or the device peripheral group in the operation execution information, and records the operation execution information of the device peripheral and/or the device peripheral group; the M2M gateway reports the successful execution of the transaction to the M2M service platform only when all the operations for the device peripheral included in the transaction are executed successfully;

when the operation execution information indicates that the execution of the operation is failed, then the M2M gateway re-executes, according to the indication of the delivery attempt times of the operation for the device peripheral, the operation of the device peripheral and/or the device peripheral group corresponding to the identification of the device peripheral and/or the device peripheral group in the operation execution information;

when the M2M gateway detects locally that the operation of the device peripheral and/or the device peripheral group expires or reaches the delivery attempt times of the operation for the device peripheral, then the M2M gateway removes locally the operation of the device peripheral and/or the device peripheral group, and records the operation execution information of the device peripheral and/or the device peripheral group; at the same time, the M2M gateway reports the failed execution of the operation for the device peripheral to the M2M service platform.

Example embodiment 2 (the indication about the delivery attempt times of):

S1: the M2M gateway receives and parses the policy definition which is issued by the M2M service platform, wherein the policy definition includes the transaction and the trigger conditions of the transaction;

S2: when the M2M gateway detects locally that the monitoring data of the device peripheral and/or the device peripheral group meets the time value defined by the trigger conditions of the transaction, it retrieves the transaction in the policy definition corresponding to the trigger conditions of the transaction;

the transaction is a group of associated operations for the device peripheral; the operations include: the identification of the device peripheral and/or the device peripheral group, the operation information, and the indication about the delivery attempt times of the operation;

S3: the M2M gateway buffers the operations in the transaction locally according to the identification of the device peripheral and/or the device peripheral group, and sends the operations in the transaction to the device peripheral and/or the device peripheral group corresponding to the identification;

S4: after the device peripheral and/or the device peripheral group receives and parses the operations in the transaction sent by the M2M gateway, the operation content included in the operation information is executed; for example, the running status of the device peripheral and/or the device peripheral group is set according to the parameter values preset in the operation content; in addition, the device peripheral and/or the device peripheral group feeds back the operation execution information to the M2M gateway;

S5: the M2M gateway processes in the following way according to feedback from the device peripheral and/or the device peripheral group:

when the operation execution information indicates that the execution of the operation is successful, then the M2M gateway removes locally the operation of the device peripheral and/or the device peripheral group corresponding to the identification of the device peripheral and/or the device peripheral group in the operation execution information, and records the operation execution information of the device peripheral and/or the device peripheral group; the M2M gateway reports the successful execution of the transaction to the M2M service platform only when all the operations for the device peripheral included in the transaction are executed successfully;

when the operation execution information indicates that the execution of the operation is failed, then the M2M gateway re-executes, according to the indication of the delivery attempt times of the operation for the device peripheral, the operation of the device peripheral and/or the device peripheral group corresponding to the identification of the device peripheral and/or the device peripheral group in the operation execution information;

when the M2M gateway detects locally that the operation of the device peripheral and/or the device peripheral group reaches the delivery attempt times of the operation, then the M2M gateway removes locally the operation of the device peripheral and/or the device peripheral group, and records the operation execution information of the device peripheral and/or the device peripheral group; at the same time, the M2M gateway reports the failed execution of the operation for the device peripheral to the M2M service platform.

Example embodiment 3 (the indication about the validity time):

S1: the M2M gateway receives and parses the policy definition which is issued by the M2M service platform, wherein the policy definition includes the transaction and the trigger conditions of the transaction;

S2: when the M2M gateway detects locally that the status of the device peripheral and/or the device peripheral group meets the status value defined by the trigger conditions of the transaction, it retrieves the transaction in the policy definition corresponding to the trigger conditions of the transaction;

the transaction is a group of associated operations for the device peripheral; the operations include: the identification of the device peripheral and/or the device peripheral group, the operation information, and the indication about the validity time of the operation;

S3: the M2M gateway buffers the operations in the transaction locally according to the identification of the device peripheral and/or the device peripheral group, sets and starts the timer according to the indication of the validity time of the operations in the transaction, and sends the operations in the transaction to the device peripheral and/or the device peripheral group corresponding to the identification;

S4: after the device peripheral and/or the device peripheral group receives and parses the operations in the transaction sent by the M2M gateway, the operation content included in the operation information is executed; for example, the running status of the device peripheral and/or the device peripheral group is set according to the parameter values preset in the operation content; in addition, the device peripheral and/or the device peripheral group feeds back the operation execution information to the M2M gateway;

S5: the M2M gateway processes in the following way according to feedback from the device peripheral and/or the device peripheral group:

when the operation execution information indicates that the execution of the operation is successful, then the M2M gateway removes locally the operation of the device peripheral and/or the device peripheral group corresponding to the identification of the device peripheral and/or the device peripheral group in the operation execution information, and records the operation execution information of the device peripheral and/or the device peripheral group; the M2M gateway reports the successful execution of the transaction to the M2M service platform only when all the operations for the device peripheral included in the transaction are executed successfully;

when the operation execution information indicates that the execution of the operation is failed, then the M2M gateway re-executes the operation of the device peripheral and/or the device peripheral group corresponding to the identification of the device peripheral and/or the device peripheral group in the operation execution information;

when the M2M gateway detects locally that the operation of the device peripheral and/or the device peripheral group expires, then the M2M gateway removes locally the operation of the device peripheral and/or the device peripheral group, and records the operation execution information of the device peripheral and/or the device peripheral group; at the same time, the M2M gateway reports the failed execution of the operation for the device peripheral to the M2M service platform.

Obviously, the skilled personnel in the field should appreciate that the above modules and steps of the present disclosure can be implemented by a general-purpose computing device, and they can be centralized in a single computing device or distributed on a network composed of multiple computing devices; optionally, they can be implemented by a program code which is capable of being executed by the computing device, so that they can be stored in a storage device and executed by the computing device; in addition, under some conditions, the presented or described steps can be executed in an order different from that described here; or they are made into integrated circuit modules, respectively; or multiple modules and steps of them are made into a single integrated circuit module to realize. In this way, the present disclosure is not limited to any particular combination of hardware and software.

The above is only the preferred embodiment of the present disclosure and not intended to limit the present disclosure; for the skilled personnel in the field, the present disclosure may have various modifications and changes. Any modifications, equivalent replacements, improvements and the like within the spirit and principle of the present disclosure shall fall within the scope of the claims of the present disclosure.

What is claimed is:

1. A method for processing one or more operations for a device peripheral and/or a device peripheral group, comprising:

acquiring, by an M2M gateway, a transaction comprising the one or more operations for the device peripheral and/or the device peripheral group, wherein the transaction comprises operation content of the one or more operations for the device peripheral and/or the device peripheral group and a preset control parameter of the one or more operations for the device peripheral and/or the device peripheral group;

executing, by the M2M gateway, the one or more operations for the device peripheral and/or the device peripheral group according to the operation content; and determining, by the M2M gateway, operation execution information of the one or more operations for the device peripheral and/or the device peripheral group according to the preset control parameter;

wherein the preset control parameter comprises delivery attempt times of the one or more operations for the device peripheral and/or the device peripheral group and/or validity time of the one or more operations for the device peripheral and/or the device peripheral group;

determining, by an M2M gateway, the operation execution information of the one or more operations for the device peripheral and/or the device peripheral group according to the preset control parameter comprises: receiving operation execution information fed back by the device peripheral and/or the device peripheral group; when the operation execution information fed back by the device peripheral and/or the device peripheral group indicates that the one or more operations fail to be executed, re-executing the one or more operations for the device peripheral and/or the device peripheral group according to the delivery attempt times of the one or more operations for the device peripheral and/or the device peripheral group and/or the validity time of the one or more operations for the device peripheral and/or the device peripheral group, and determining that the one or more operations for the device peripheral and/or the device peripheral group fail to be executed according to operation execution information fed back by the device peripheral and/or the device peripheral group after the one or more operations for the device peripheral and/or the device peripheral group are re-executed, wherein after determining, by an M2M gateway, the operation execution information of the one or more operations for the device peripheral and/or the device peripheral group according to the preset control parameter, the method further comprises: removing the one or more operations for the device peripheral and/or the device peripheral group corresponding to the operation execution information.

2. The method as claimed in claim 1, wherein acquiring, by an M2M gateway, the transaction comprising the one or more operations for the device peripheral and/or the device peripheral group comprises:
receiving policy definition information which is issued from a Machine-to-Machine/Men (M2M) service platform, wherein the policy definition information comprises the transaction comprising the one or more operations for the device peripheral and/or the device peripheral group and a trigger condition of the transaction;
when it is detected that the trigger condition of triggering the transaction is satisfied, retrieving the transaction corresponding to the trigger condition.

3. The method as claimed in claim 1, determining, by an M2M gateway, the operation execution information of the one or more operations for the device peripheral and/or the device peripheral group according to the preset control parameter further comprises:
when the operation execution information fed back by the device peripheral and/or the device peripheral group indicates that the one or more operations for the device peripheral and/or the device peripheral group are executed successfully, determining that the one or more operations for the device peripheral and/or the device peripheral group are executed successfully.

4. The method as claimed in claim 1, wherein determining that the one or more operations for the device peripheral and/or the device peripheral group fail to be executed according to the operation execution information fed back by the device peripheral and/or the device peripheral group after the one or more operations for the device peripheral and/or the device peripheral group are re-executed comprises at least one of the followings:
when the operation execution information which is fed back by the device peripheral and/or the device peripheral group and indicates that the one or more operations are executed successfully is not received, and the number of times of executing the one or more operations for the device peripheral and/or the device peripheral group reaches the delivery attempt times of the one or more operations for the device peripheral and/or the device peripheral group, determining that the one or more operations for the device peripheral and/or the device peripheral group fail to be executed;
when the operation execution information which is fed back by the device peripheral and/or the device peripheral group and indicates that the one or more operations are executed successfully is not received, and the validity time expires, determining that the one or more operations for the device peripheral and/or the device peripheral group fail to be executed;
when the operation execution information which is fed back by the device peripheral and/or the device peripheral group and indicates the one or more operations are executed successfully is not received, and the number of times of executing the one or more operations for the device peripheral and/or the device peripheral group reaches the delivery attempt times of the one or more operations for the device peripheral and/or the device peripheral group in the validity time, determining that the one or more operations for the device peripheral and/or the device peripheral group fail to be executed; and
when the number of times of executing the one or more operations for the device peripheral and/or the device peripheral group does not reach the delivery attempt times of the one or more operations for the device peripheral and/or the device peripheral group, but the operation execution information which is fed back by the device peripheral and/or the device peripheral group and indicates that the one or more operations for the device peripheral and/or the device peripheral group are executed successfully is not received when the validity time expires, determining that the one or more operations for the device peripheral and/or the device peripheral group fail to be executed.

5. The method as claimed in claim 1, wherein after determining, by an M2M gateway, the operation execution information of the one or more operations for the device peripheral and/or the device peripheral group according to the preset control parameter, the method further comprises:
recording the operation execution information of the one or more operations for the device peripheral and/or the device peripheral, or
reporting the operation execution information to an M2M service platform.

6. A device for processing one or more operations for a device peripheral and/or a device peripheral group, comprising:
an acquiring component, configured to acquire a transaction comprising the one or more operations for the device peripheral and/or the device peripheral group, wherein the transaction comprises operation content of the one or more operations for the device peripheral and/or the device peripheral group and a preset control parameter of the one or more operations for the device peripheral and/or the device peripheral group;
an executing component, configured to execute the one or more operations for the device peripheral and/or the device peripheral group according to the operation content; and
a determining component, configured to determine operation execution information of the one or more operations for the device peripheral and/or the device peripheral group according to the preset control parameter;
wherein the preset control parameter comprises delivery attempt times of the one or more operations for the device peripheral and/or the device peripheral group and/or validity time of the one or more operations for the device peripheral and/or the device peripheral group;
wherein the determining component comprises: a second receiving element, configured to receive operation execution information fed back by the device peripheral and/or the device peripheral group; a second determining element, configured to, when the operation execution information fed back by the device peripheral and/or the device peripheral group indicates that the one or more operations fail to be executed, re-execute the one or more operations for the device peripheral and/or the device peripheral group according to the delivery attempt times of the one or more operations for the device peripheral and/or the device peripheral group and/or the validity time of the one or more operations for the device peripheral and/or the device peripheral group, and determine that the one or more operations for the device peripheral and/or the device peripheral group fail to be executed according to operation execution information fed back by the device peripheral and/or the device peripheral group after the one or more operations for the device peripheral and/or the device peripheral group are re-executed, wherein the device further comprises: a removing component, configured to removed the one or more operations for the device peripheral and/or the device peripheral group corresponding to the operation execution information.

7. The device as claimed in claim 6, wherein the acquiring component comprises:
 a first receiving element, configured to receive policy definition information which is issued from a Machine-to-Machine/Men (M2M) service platform, wherein the policy definition information comprises the transaction comprising the one or more operations for the device peripheral and/or the device peripheral group and a trigger condition of the transaction; and
 a retrieving element, configured to, when it is detected that the trigger condition of triggering the transaction is satisfied, retrieve the transaction corresponding to the trigger condition.

8. The device as claimed in claim 6, wherein the determining component further comprises:
 a first determining element, configured to, when the operation execution information fed back by the device peripheral and/or the device peripheral group indicates that the one or more operations for the device peripheral and/or the device peripheral group are executed successfully, determine that the one or more operations for the device peripheral and/or the device peripheral group are executed successfully.

9. The device as claimed in claim 6, wherein the second determining element comprises at least one of the followings:
 a first determining sub-element, configured to, when the operation execution information which is fed back by the device peripheral and/or the device peripheral group and indicates that the one or more operations are executed successfully is not received, and the number of times of executing the one or more operations for the device peripheral and/or the device peripheral group reaches the delivery attempt times of the one or more operations for the device peripheral and/or the device peripheral group, determine that the one or more operations for the device peripheral and/or the device peripheral group fail to be executed;
 a second determining sub-element, configured to, when the operation execution information which is fed back by the device peripheral and/or the device peripheral group and indicates that the one or more operations are executed successfully is not received, and, the validity time expires, determine that the one or more operations for the device peripheral and/or the device peripheral group fail to be executed;
 a third determining sub-element, configured to, when the operation execution information which is fed back by the device peripheral and/or the device peripheral group and indicates the one or more operations are executed successfully is not received, and the number of times of executing the one or more operations for the device peripheral and/or the device peripheral group reaches the delivery attempt times of the one or more operations for the device peripheral and/or the device peripheral group in the validity time, determine that the one or more operations for the device peripheral and/or the device peripheral group fail to be executed; and
 a fourth determining sub-element, configured to, when the number of times of executing the one or more operations for the device peripheral and/or the device peripheral group does not reach the delivery attempt times of the one or more operations for the device peripheral and/or the device peripheral group, but the operation execution information which is fed back by the device peripheral and/or the device peripheral group and indicates that the one or more operations for the device peripheral and/or the device peripheral group are executed successfully is not received when the validity time expires, determine that the one or more operations for the device peripheral and/or the device peripheral group fail to be executed.

10. The device as claimed in claim 6, the device further comprises:
 a recording component, configured to record the operation execution information of the one or more operations for the device peripheral and/or the device peripheral, or
 a reporting component, configured to report the operation execution information to an M2M service platform.

11. The method as claimed in claim 2, wherein after determining the operation execution information of the one or more operations for the device peripheral and/or the device peripheral group according to the preset control parameter, the method further comprises one of the followings:
 removing the one or more operations for the device peripheral and/or the device peripheral group corresponding to the operation execution information;
 recording the operation execution information of the one or more operations for the device peripheral and/or the device peripheral group;
 reporting the operation execution information to an M2M service platform.

12. The method as claimed in claim 3, wherein after determining the operation execution information of the one or more operations for the device peripheral and/or the device peripheral group according to the preset control parameter, the method further comprises one of the followings:
 removing the one or more operations for the device peripheral and/or the device peripheral group corresponding to the operation execution information;
 recording the operation execution information of the one or more operations for the device peripheral and/or the device peripheral group;
 reporting the operation execution information to an M2M service platform.

13. The method as claimed in claim 4, wherein after determining the operation execution information of the one or more operations for the device peripheral and/or the device peripheral group according to the preset control parameter, the method further comprises one of the followings:
 removing the one or more operations for the device peripheral and/or the device peripheral group corresponding to the operation execution information;
 recording the operation execution information of the one or more operations for the device peripheral and/or the device peripheral group;
 reporting the operation execution information to an M2M service platform.

14. The device as claimed in claim 7, the device further comprises one of the followings:
 a removing component, configured to remove the one or more operations for the device peripheral and/or the device peripheral group corresponding to the operation execution information;

a recording component, configured to record the operation execution information of the one or more operations for the device peripheral and/or the device peripheral group;

a reporting component, configured to report the operation execution information to an M2M service platform.

15. The device as claimed in claim 8, the device further comprises one of the followings:

a removing component, configured to remove the one or more operations for the device peripheral and/or the device peripheral group corresponding to the operation execution information;

a recording component, configured to record the operation execution information of the one or more operations for the device peripheral and/or the device peripheral group;

a reporting component, configured to report the operation execution information to an M2M service platform.

16. The device as claimed in claim 9, the device further comprises one of the followings:

a removing component, configured to remove the one or more operations for the device peripheral and/or the device peripheral group corresponding to the operation execution information;

a recording component, configured to record the operation execution information of the one or more operations for the device peripheral and/or the device peripheral group;

a reporting component, configured to report the operation execution information to an M2M service platform.

* * * * *